United States Patent [19]

Hsieh

[11] Patent Number: 5,334,699

[45] Date of Patent: Aug. 2, 1994

[54] POLYMERIC INITIATOR COMPOUNDS

[75] Inventor: Bing R. Hsieh, Webster, N.Y.

[73] Assignee: Xerox Corporation, Stamford, Conn.

[21] Appl. No.: 905,609

[22] Filed: Jun. 29, 1992

[51] Int. Cl.$^5$ .................. C08G 75/00; C08G 63/02; C08G 63/68
[52] U.S. Cl. ................... 528/373; 430/114; 430/115; 525/437; 525/461; 528/272; 528/293; 528/294; 522/31
[58] Field of Search ........... 522/31; 525/437; 528/272, 293, 294, 373; 430/114, 115

[56] References Cited

U.S. PATENT DOCUMENTS

| | | | |
|---|---|---|---|
| 3,989,644 | 11/1976 | Bolon et al. | 252/514 |
| 4,264,703 | 4/1981 | Crivello | 430/270 |
| 4,840,977 | 6/1989 | Crivello et al. | 522/25 |
| 4,933,377 | 6/1990 | Saeva et al. | 522/31 |

FOREIGN PATENT DOCUMENTS 3914407 10/1990 Fed. Rep. of Germany .

OTHER PUBLICATIONS

Polymerization-Polymer Bulletin 16, 243-248 (1986) (Springer-Verlag 1986).
"Synthesis and Characterization of Photosensitive Polyimides" J. V. Crivello, J. L. Lee, D. A. Conlon, General Electric Journal of Polymer Science Part A: Polymer Chemistry, vol. 25, 3293-3309 (1987).

*Primary Examiner*—John Kight, III
*Assistant Examiner*—T. Mosley
*Attorney, Agent, or Firm*—Judith L. Byorick

[57] ABSTRACT

Disclosed are polyesters and polycarbonates of the formulae

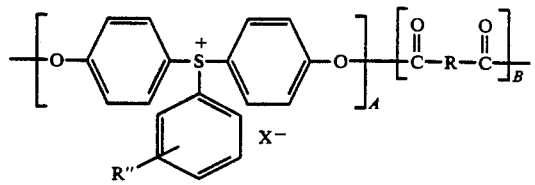

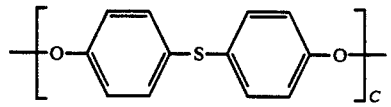

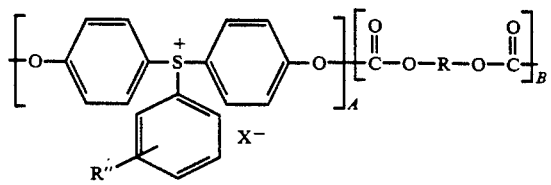

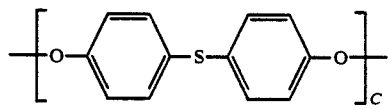

wherein X is an anion with weak nucleophilicity, A, B, and C represent the number of repeat monomer units, wherein C may be zero, R is selected from the group consisting of hydrocarbon groups and alkylene ether groups, and R" is selected from the group consisting of hydrogen, nitro, amide, halide, trimethylsilyl, alkyl groups, and alkoxy groups. The compounds are suitable for use as polymerization initiators, particularly in applications wherein curable liquids are cured to solids. One specific embodiment of the invention is directed to a curable liquid developer composition comprising a colorant, a polymeric compound of the above formula, and a substantial amount of a curable liquid vehicle having a viscosity of no more than about 500 centipoise and a resistivity of no less than about $10^8$ ohm-cm.

33 Claims, No Drawings

POLYMERIC INITIATOR COMPOUNDS

BACKGROUND OF THE INVENTION

The present invention is directed to polymeric compounds suitable as initiators for polymerization reactions. More specifically, the present invention is directed to polymeric compounds based on triphenyl sulfonium salt units which are useful in several polymerization applications, such as curable coatings and curable liquid developers. One embodiment of the present invention is directed to polyesters and polycarbonates of the formulae

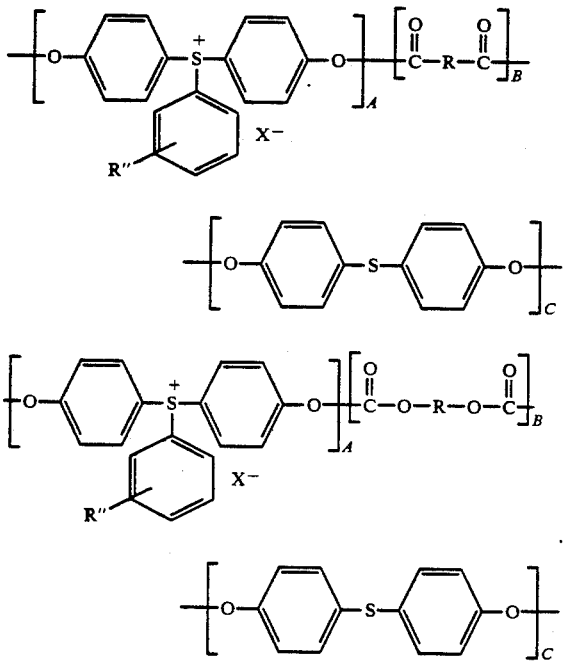

wherein X is an anion with weak nucleophilicity, A, B, and C represent the number of monomer units, wherein C may be zero, R is selected from the group consisting of hydrocarbon groups and alkylene ether groups, and R" is selected from the group consisting of hydrogen, nitro, amide, halide, trimethylsilyl, alkyl groups, and alkoxy groups.

Polymeric compounds useful as polymerization initiators are known. For example, polystyrene based iodonium compositions and polyimide/triphenyl sulfonium compounds have been described as useful initiators by Crivello et al., *Journal of Polymer Science: Part A: Polymer Chemistry*, vol. 25, 3293–3309 (1987) and Crivello et al., *J. L. Polymer Bulletin*, vol. 16, 243–248 (1986), the disclosures of each of which are totally incorporated herein by reference. The major advantages associated with these initiators include low toxicity and low volatile by-product from the curing process. The synthesis of these polymeric initiators, however, is very complicated, requiring multistep syntheses.

U.S. Pat. No. 4,840,977 (Crivello et al.), the disclosure of which is totally incorporated herein by reference, discloses photosensitive iodonium polymers which are useful as positive photoresists. The iodonium polymers can be converted to polymeric diaryl iodonium polyfluorometal and metalloid salts by a metathesis reaction. The polymeric iodonium polyfluorometal and metalloid salts can be used as a catalyst in combination with a copper compound cocatalyst to make heat curable compositions with cationically polymerizable materials such as an epoxy resin.

U.S. Pat. No. 4,264,703 (Crivello), the disclosure of which is totally incorporated herein by reference, discloses cationic polymerization of a variety of organic materials such as vinyl monomers, prepolymers, cyclic ethers, cyclic esters, and organosilicon cyclics by the use of certain radiation sensitive aromatic halonium salts. In addition, polymerizable compositions are provided which can be used as coating compounds, molding resins, and adhesives.

U.S. Pat. No. 3,989,644 (Bolon et al.) discloses a radiation curable ink which is convertible to a conductive coating when cured on the surface of a substrate. A non-ionic surfactant is used in the curable ink in combination with a particulated metal containing conductive filler and an organic resin binder. As a result of using the non-ionic surfactant, a reduction was achieved in the tendency of the curable ink to form two distinct layers based on the separation of the conductive filler from the organic resin binder.

U.S. Pat. No. 4,933,377 (Saeva et al.) discloses sulfonium and oxysulfonium salts useful as photoinitiators which have directly attached to the sulfur atom thereof at least one aromatic or heterocyclic aromatic substituent containing at least 14 aromatic atoms and having a removable positive hydrogen ion, said substituent exhibiting a higher energy occupied molecular orbital than at least one other substituent directly attached to the sulfur atom, and at least one substituent comprising an electron withdrawing group and exhibiting a lower energy unoccupied molecular orbital than at least one other substituent directly attached to the sulfur atom, the salt being capable, upon exposure to visible radiation, of undergoing irreversible intramolecular rearrangement to form a Bronsted acid comprising the anion of the salt add the removable positive hydrogen ion.

Although known compositions and processes are suitable for their intended purposes, a need remains for polymerization initiators suitable for use in processes where liquids are cured to solids. In addition, a need remains for polymeric polymerization initiators that are easy to synthesize. Further, a need remains for easily synthesized polymerization initiators that enable rapid photo curing or thermal curing of materials such as vinyl ethers and epoxies. Additionally, there is a need for polymerization initiators that are insoluble in or of low solubility in the curing materials which are useful for curable liquid developers.

SUMMARY OF THE INVENTION

It is an object of the present invention to provide polymeric polymerization initiators with the above advantages.

It is another object of the present invention to provide polymerization initiators suitable for use in processes where liquids are cured to solids.

It is yet another object of the present invention to provide polymeric polymerization initiators that are easy to synthesize.

It is still another object of the present invention to provide easily synthesized polymerization initiators that enable rapid photo curing or thermal curing of materials such as vinyl ethers and epoxies.

Another object of the present invention is to provide polymerization initiators that are insoluble in or of low solubility in the curing materials which are useful for curable liquid developers.

These and other objects of the present invention (or specific embodiments thereof) can be achieved by providing polyesters and polycarbonates of the formulae

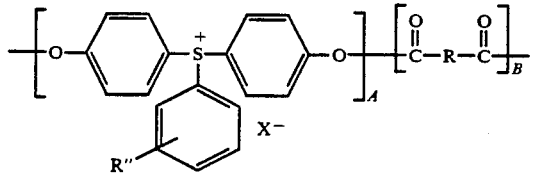

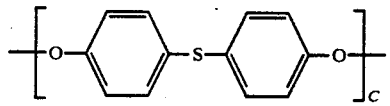

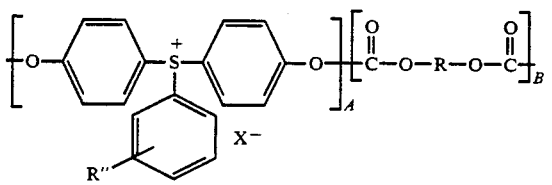

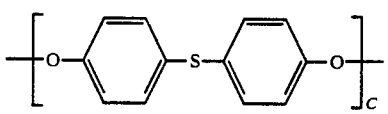

wherein X is selected from the group consisting of anions with weak nucleophilicity, A, B, and C represent the number of monomer units, wherein C may be zero, R is selected from the group consisting of hydrocarbon groups and alkylene ether groups, and R" is selected from the group consisting of hydrogen, nitro, amide, halide, trimethylsilyl, alkyl groups, and alkoxy groups. Another embodiment of the present invention is directed to curing processes which comprise preparing a mixture of a curable liquid and a polymeric compound of the present invention and curing the liquid to a solid. Yet another embodiment of the present invention is directed to curable liquid developer compositions comprising a colorant, a polymeric compound of the present invention, and a substantial amount of a curable liquid vehicle having a viscosity of no more than about 500 centipoise and a resistivity of no less than about $10^8$ ohm-cm.

DETAILED DESCRIPTION OF THE INVENTION

The polyester compounds of the present invention are of the general formula

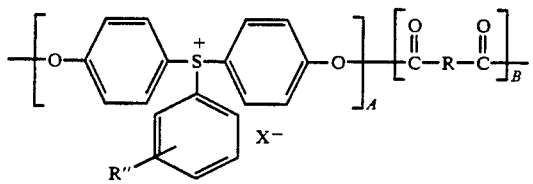

-continued

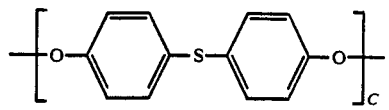

and the polycarbonate compounds of the present invention are of the general formula

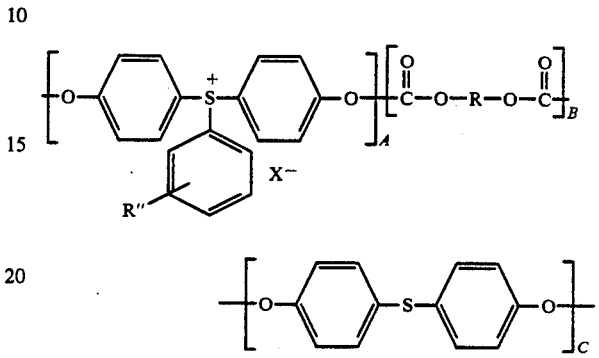

wherein X is selected from the group consisting of anions with weak nucleophilicity, such as $AsF_6^-$, $SbF_6^-$, $PF_6^-$, $CF_3SO_3^-$, $BF_4^-$, $HSO_4^-$, $CF_3COO^-$, $NO_2$—$C_6H_4$—$SO_3^-$, or the like, A, B, and C represent the number of monomer units, wherein C may be zero, R is selected from the group consisting of hydrocarbon groups and alkylene ether groups, and R" is selected from the group consisting of hydrogen, nitro, amide, halide, trimethylsilyl, alkyl groups with from about 1 to about 22 carbon atoms and alkoxy groups with from about 1 to about 20 carbon atoms. The polymers are random terpolymers or quaterpolymers wherein A, B, and C represent the numbers of repeating segments, with the sum of A and C typically being about equal to B. The number average molecular weight ($M_n$) generally is from about 500 to about 100,000, and preferably from about 500 to about 20,000, although the value can be outside these ranges. Generally, the ratio of phenylsulfide monomer units ("C") to sulfonium monomer units ("A") is from about 0:100 to about 95:5, and preferably from about 50:50 to about 80:20, although the value can be outside these ranges.

The anion X is generally a moiety of low nucleophilicity and a moiety that can be protonated to form a strong acid. Examples of suitable X groups include $AsF_6^-$, $SbF_6^-$, $PF_6^-$, $CF_3SO_3^-$, $BF_4^-$, $HSO_4^-$, $CF_3COO^-$, $NO_2$—$C_6H_4$—$SO_3^-$, and the like.

Examples of suitable R groups include linear and branched hydrocarbon groups, including alkyl groups with from about 1 to about 22 carbon atoms, preferably with from about 2 to about 8 carbon atoms, although the number of carbon atoms can be outside of this range, such as —$(CH_2)_2$—, —$(CH_2)_8$—, —$(CH_2)_{12}$—, and the like; aryl groups with from about 6 to about 50 carbon atoms, preferably with from about 6 to about 20 carbon atoms, although the number of carbon atoms can be outside of this range, such as o-phenylene, m-phenylene, p-phenylene, bisphenylene, 4,4'-isopropylidene bisphenylene, and the like; and alkylene ether groups wherein the alkylene portion has from about 1 to about 10 carbon atoms, preferably from about 1 to about 4 carbon atoms, although the number of carbon atoms can be outside of this range, including ethylene ethers such as —$(CH_2CH_2O)_2$—, —$(CH_2CH_2$—O—$CH_2CH_2)$—, and —(CH$_2$CH$_2$—O—CH$_2$CH$_2$—O—CH$_2$CH$_2$)—, propylene ethers, methylene ethers, butylene ethers, and the like.

The group R" is selected from the group consisting of hydrogen, nitro, amide, halide, trimethylsilyl, linear and branched alkyl groups with from about 1 to about 22 carbon atoms, preferably with from about 1 to about 10 carbon atoms, although the number of carbon atoms can be outside of this range, such as iso-butyl, t-butyl, n-butyl, t-octyl, hexyl, and the like, and alkoxy groups with from about 1 to about 20 carbon atoms, preferably with from about 1 to about 10 carbon atoms, although the number of carbon atoms can be outside of this range, such as methoxy, ethoxy, butoxy, hexoxy, benzyloxy, and the like.

The polymeric compounds of the present invention can be prepared from a precursor polyester of the general formula

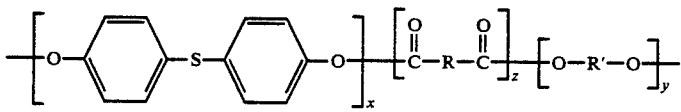

or a precursor polycarbonate of the general formula

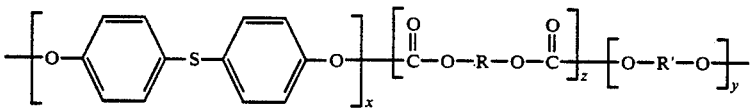

wherein X, Y, and Z represent the number of monomer units, wherein Y may be zero, R and R' are independently selected from the group consisting of linear and branched hydrocarbon groups, including alkyl groups with from about 1 to about 22 carbon atoms, preferably with from about 2 to about 8 carbon atoms, although the number of carbon atoms can be outside of this range, such as —(CH$_2$)$_2$—, —(CH$_2$)$_8$—, —(CH$_2$)$_{12}$—, and the like; aryl groups with from about 6 to about 50 carbon atoms, preferably with from about 6 to about 20 carbon atoms, although the number of carbon atoms can be outside of this range, such as o-phenylene, m-phenylene, p-phenylene, bisphenylene, 4,4'-isopropylidene bisphenylene, and the like; and alkylene ether groups wherein the alkylene portion has from about 1 to about 10 carbon atoms, preferably from about 1 to about 4 carbon atoms, although the number of carbon atoms can be outside of this range, including ethylene ethers such as —(CH$_2$CH$_2$O)$_2$—, —(CH$_2$CH$_2$—O—CH$_2$CH$_2$)—, and —(CH$_2$CH$_2$—O—CH$_2$CH$_2$—O—CH$_2$CH$_2$)—, propylene ethers, methylene ethers, butylene ethers, and the like. The number average molecular weight (M$_n$) of the precursor polymer generally is from about 500 to about 100,000, and preferably from about 500 to about 20,000, although the value can be outside these ranges. Typically, the value of (X+Y)/Z is from about 0.5 to about 1.5, and preferably from about 0.7 to about 1.3, although the value can be outside these ranges. Generally, the ratio of "Y" monomer units to "X" monomer units is from about 0:100 to about 95:5, and preferably from about 50:50 to about 80:20, although the value can be outside these ranges.

In general, a polyester compound of the present invention can be prepared by first preparing a precursor polyester by the condensation polymerization of thiodiphenol, with or without other diols, and one or more dicarboxylic acids (or the corresponding derivatives such as diacid halides or dialkyl esters) by solution, melt, or interfacial polymerization processes.

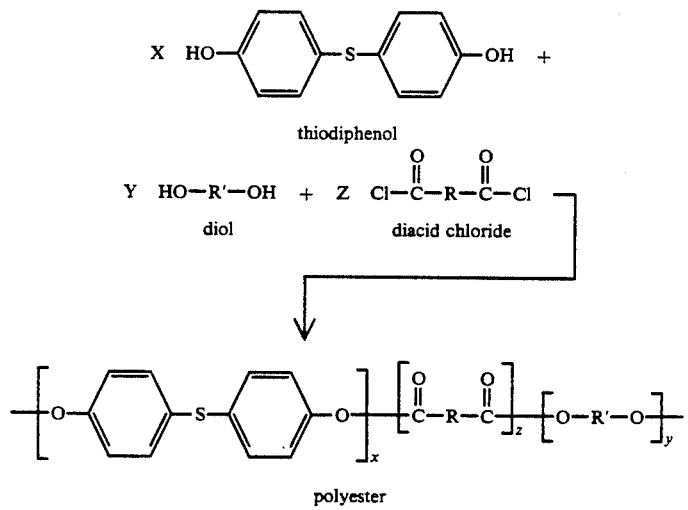

Similarly, a polycarbonate compound of the present invention can be prepared from a precursor polycarbonate by condensation polymerization of thiodiphenol, with or without other diols, and one or more bishaloformates, including phosgene and triphosgene, by solution, melt, or interfacial processes.

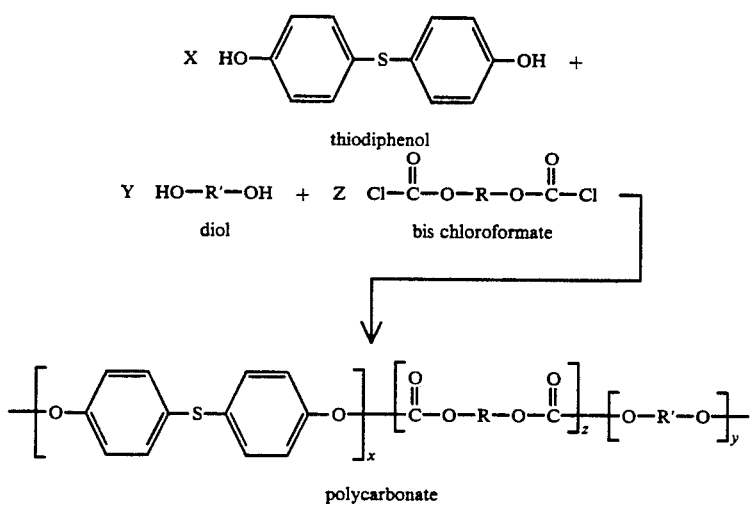

polycarbonate

The diols can be aliphatic diols (wherein the hydroxy group is bound to an aliphatic moiety), such as 1,3-propanediol, 1,6-hexanediol, 2,2-dimethyl-1,3-propanediol, diethylene glycol, triethylene glycol, 1,3-benzene dimethanol, 1,4-benzene-dimethanol, 1,3-benzene diethanol, 2-butene-1,4-diol, and the like, or phenolic diols (wherein the hydroxy group is bound to an aromatic ring), such as bisphenol A, 4,4'-dihydroxy-diphenol-2,2-butane, 4,4'-dihydroxy-diphenyl, catechols, resorcinols, hydroquinones, 2,6-dihydroxybenzoic acid ethyl ester, 4,4'-dihydroxy-diphenyl ether, and the like. The dicarboxylic acid derivatives (including the corresponding dicarboxylic acid chlorides and dicarboxylic dialkyl asters) can be nonaromatic, such as 1,4-butane dicarboxylic acid, 1,8-octane dicarboxylic acid, 1,4-cyclohexane dicarboxylic acid, fumaric acid, phenylene diacetic acids, 1,4-phenylene diacrylic acid, muconic acid, and the like, or aromatic, such as terephthalic acids, phthalic acids, isophthalic acids, and the like. The bischloroformates can be nonaromatic, such as ethylene glycol bischloroformate, diethylene glycol chloroformate, triethylene glycol bischloroformate, propylene glycol bischloroformate, 1,6-hexanediol bischloroformate, 1,4-butanediol bischloroformate, and the like, or aromatic, such as bisphenol A-bischloroformate, hydroquinone bischloroformate, 4,4'-biphenol bischloroformate, resorcinol bischloroformate, and the like.

The precursor polyester or polycarbonate thus obtained is then treated with a diphenyl iodonium salt in the presence of a catalytic amount of a compound such as copper(II) benzoate, copper (I) chloride, copper (II) acetylacetonate, copper (II) acetate, copper (II) benzoate, copper (II) stearate, or the like to yield a polymeric compound of the present invention. The percentage of triphenyl sulfonium units within the compound of the present invention is controlled by the amount of diphenyl iodonium salt employed in the synthesis.

More specifically, the compounds of the present invention can be prepared as follows. In an interfacial polymerization to form a polyester, a bisphenol aqueous solution comprising at least one thiodiphenol derivative as well as other optional bisphenols is prepared using an equivalent amount of sodium hydroxide or potassium hydroxide to effect solubilization of the bisphenols. A small amount, typically from about 0.1 to about 0.2 mole equivalent (with respect to every one mole equivalent of the total of all bisphenols present), of sodium or potassium carbonate or bicarbonate is also present in the aqueous solution as a pH buffer. Another aqueous solution of a phase transfer catalyst is also prepared. An organic solution of one or more dicarboxylic acid chlorides is prepared in a water immiscible organic solvent, such as benzene, toluene, chloroform, dichloromethane, or the like. The molar ratio of the bisphenols and the dicarboxylic acid chlorides typically ranges from about 0.5:1 to about 1.5:1, and preferably ranges from about 0.7:1 to about 1.3:1, although the ratio can be outside this range. The molecular weight and the chain ends of the polyester can be controlled by selecting an appropriate molar ratio. Interfacial polymerization proceeds by mixing the bisphenol, phase transfer catalyst, and dicarboxylic acid chloride solutions at a temperature typically ranging from about −20° C. to about 30° C. for at least 30 minutes. The resulting polyester is isolated by precipitation of the organic layer into a nonsolvent such as acetone, methanol, ethanol, or the like, followed by filtration and vacuum drying, typically at from about 50 to about 100° C. for at least 3 hours. Interfacial synthesis of a polycarbonate having thiodiphenyl linkages can be performed similarly by using a combination of phosgene and bischloroformates in place of the dicarboxylic acid chlorides.

In solution polymerization of a polycarbonate, a thiodiphenol solution, which may comprise at least one thiodiphenol derivative, other optional bisphenols, and about two mole equivalents (with respect to every one mole equivalent of the total of all bischloroformates present) of pyridine or a tertiary amine, such as triethylamine or tri(n-butyl)amine, is prepared using an organic solvent such as benzene, toluene, chloroform, dichloromethane, tetrahydrofuran, dioxane, dimethylformamide, or the like. Another organic solution which contains phosgene and/or other bischloroformates is also prepared using an organic solvent. The polymerization proceeds by adding the phosgene/bischloroformate solution to the thiodiphenol solution, typically at from about −20° C. to about 30° C. The molar ratios of the bisphenols and phosgene/bischloroformates typically ranges from about 0.5:1 to about 1.5:1, and preferably from about 0.7:1 to about 1.3:1, although the ratio can be outside this range. The polymerization may proceed for at least 30 minutes after the addition is completed. The polycarbonate is isolated by precipitation into a non-solvent such as methanol, ethanol, or acetone, followed by filtration and vacuum drying, typically at from about 50 to about 100° C. for at least 3 hours. Solution polymerization for the preparation of a polyester having thiodiphenyl linkages can be performed similarly by using dicarboxylic acid chlorides in place of phosgene and bischloroformates.

Examples of thiodiphenol derivatives include 4,4'-thiodiphenol, 3,3'-dimethyl-4,4'-thiodiphenol, 3,3'-thiodiphenol, 3,4'-thiodiphenol, 3,3'-dichloro-4,4'-thiodiphenol, and the like. Examples of bisphenols include bisphenol A, bis (4-hydroxyphenyl) methane, resorcinol, 4-hexylresorcinol, phenylhydroquinone, 4,4'-dihydroxy biphenyl, 2,2-bis (4-hydroxyphenyl) butane, and the like. Examples of phase transfer catalysts include triethylamine, tri(n-butyl)amine, trimethylcetytammonium bromide, triethylbenzylammonium chloride, tetrabutylphosphonium iodide, methyl triphenyl phosphonium chloride, and the like. Examples of dicarboxylic acid chlorides include adipyl diacid chloride, sebacyl diacid chloride, isophthaloyl diacid chloride, terephthaloyl diacid chloride, 2,2-bis(4-carboxyphenyl)propane diacid chloride, bis(4-carboxyphenyl)ketone diacid chloride, 2,5-pyridinedicarboxylic acid chloride, 4,4'-biphenyldicarboxylic acid chloride, and the like. Examples of bischloroformates include ethylene bischloroformate, 2,2-dimethyltrimethylene bischloroformate, 1,4-cyclohexylene bischloroformate, 3-oxapentane-1,5-bischloroformate, 1,4-phenylenebischloroformate, and the like.

The conversion of a polyester or a polycarbonate to the corresponding polymeric initiator is accomplished by heating the polyester or polycarbonate with a diphenyliodonium salt in the presence of a catalytic amount of a copper salt in a high boiling organic solvent, typically at from about 100° to about 200° C. for at least about 2 hours. The reaction may be carried out under ambient conditions or under nitrogen. The weight percent of the diphenyl iodonium salt to the polymer typically ranges from about 0.5 to about 50 percent, and preferably from about 5 to about 20 percent. The weight percent of the copper catalyst to the diphenyliodonium salt typically ranges from about 5 to about 2 percent.

Examples of diphenyliodonium salts include diphenyliodonium hexafluoroarsenate, diphenyliodonium hexafluorophosphate, diphenyliodonium hexafluoroantimonate, di-(4-t-butylphenyl)iodonium hexafluorophosphate, di-(4-t-butylphenyl)iodonium hexafluoroarsenate, di-(4-i-butylphenyl)iodonium hexafluoroantimonate, di-(4-methoxyphenyl)iodonium tetrafluoroborate, di-(4-chlorophenyl)iodonium hexafluoroarsenate, and the like. Examples of copper salts include copper (I) chloride, copper (II) acetylacetonate, copper (II) acetate, copper (II) benzoate, copper (II) stearate, and the like. Examples of high boiling organic solvents include xylenes, toluene, chlorobenzene, nitrobenzene, o-dichlorobenzene, and the like.

The present invention also includes curing processes which comprise preparing a mixture of a curable liquid and a polymeric compound of the present invention and curing the liquid to a solid. The polymeric compound of the present invention, which functions as a polymerization initiator, can be present in any effective amount. Typically, in a mixture containing the polymeric compound and a curable liquid, the components are present in relative amounts of from about 1 parts by weight of the polymeric compound and about 99 parts by weight of the curable liquid to about 10 parts by weight of the polymeric compound and about 90 parts by weight of the curable liquid, although the relative amounts can be outside of this range. The curable liquid can be any liquid capable of being cured to a solid by polymerization of the liquid.

The polymeric compounds of the present invention can be used as supported initiators, using fine particles or sheet substrates as the supports. Examples of fine particles include silica particles, such as Aerosil available from Degussa, aluminum oxide, clay, polymeric colloidal particles, and the like. The polymeric initiator compound can be applied to supporting fine particles by any suitable process, such as fluid bed coating, spray drying, or the like. Examples of sheet substrates include paper, plastic sheets, fabrics, and the like. In this embodiment, the fine particles containing the initiator can be added to a curable liquid to initiate curing (along with exposure to heat or ultraviolet light or any other means for effecting curing, if necessary). The polymeric initiator compound can be applied to a sheet support by any suitable method, such as spray coating, impregnation, or the like. In this embodiment, a curable liquid can be applied to a sheet substrate containing the polymeric initiator of the present invention to initiate curing (along with exposure to heat or ultraviolet light or any other means for effecting curing, if necessary).

Typical curable liquids include ethylenically unsaturated compounds, including monomers, dimers, or oligomers having one or more ethylenically unsaturated groups such as vinyl or allyl groups, and polymers having terminal or pendant ethylenic unsaturation. Examples of curable liquids suitable for present invention include, but are not limited to, acrylate and methacrylate monomers or polymers containing acrylic or methacrylic group(s) of the general structure

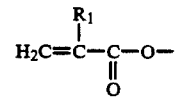

wherein $R_1$ is H or $CH_3$. The active group can be attached to an aliphatic or aromatic group with from 1 to about 20 carbon atoms and preferably from about 8 to about 12 carbon atoms, to an aliphatic or aromatic siloxane chain or ring with from 1 to about 20 dimethyl siloxane units, to a combination of the aforementioned groups, or to a polymer chain. Examples of such compounds include n-dodecyl acrylate, n-lauryl acrylate, methacryloxypropylpenta-methyldisiloxane, methyl-bis(trimethylsioxy)silylpropylgylcerolmethacrylate, bis(methacryloxybutyl)tetramethyldisiloxane, 2-phenoxyethyl acrylate, polyethylene glycol diacrylate, ethyoxylated bisphenol A diacrylate, pentaerythritol triacrylate, poly(acryloxypropylmethyl)siloxane, methacrylate terminated polystyrene, polybutyldiene diacrylate, and the like. Further examples of liquids believed to be suitable for the present invention include acrylic and methacrylic esters of polyhydric alcohols such as trimethylolpropane, pentaerythritol, and the like, and acrylate or methacrylate terminated epoxy resins, acrylate or methacrylate terminated polyesters, and the like. Another polymerizable material is the reaction product of epoxidized soy bean oil and acrylic or methacrylic acid as described in U.S. Pat. No. 4,215,167, the disclosure of which is totally incorporated herein by reference, as well as the urethane and amine derivatives described therein. Additional examples of radiation curable substances include acrylate prepolymers derived from the partial reaction of pentaerythritol with acrylic acid or acrylic acid esters, including those available from Richardson Company, Melrose Park, Ill. Further, isocyanate modified acrylate, methacrylate and itaconic acid esters of polyhydric alcohols as disclosed in U.S. Pat. Nos. 3,783,151, 3,759,809, and 3,825,479 are believed to be suitable. Radiation curable compositions based on these isocyanate modified esters including reactive diluents such as tetraethylene glycol diacrylate as well as photoinitiators such as chlorinated resins, chlorinated paraffins, and amine photoinitiation synergists are commercially available from Sun Chemical Corporation under the trade name of Suncure. Also believed to be suitable are mixtures of pentaerythritol acrylate and halogenated aromatic, alicyclic, or aliphatic photoinitiators as described in U.S. Pat. No. 3,661,614, the disclosure of which is totally incorporated herein by reference, as well as other halogenated resins that can be crosslinked by ultraviolet radiation. Additionally, materials believed to be suitable are disclosed in U.S. Pat. No. 4,399,209, the disclosure of which is totally incorporated herein by reference.

Also suitable are epoxy monomers or epoxy containing polymers having one or a plurality of epoxy functional groups, such as those resins which result from the reaction of bisphenol A (4,4'-isopropylidenediphenol) and epichlorohydrin, or by the reaction of low molecular weight phenol-formaldehyde resins (Novolak resins) with epichlorohydrin, alone or in combination with an epoxy containing compound as a reactive diluent. Reactive diluents such as phenyl glycidyl ether, 4-vinylcyclohexene dioxide, limonene dioxide, 1,2-cyclohexane oxide, glycidyl acrylate, glycidyl methacrylate, styrene oxide, allyl glycidyl ether, and the like may be used as viscosity modifying agents. In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the initiators of the present invention are epoxy-polyurethanes, epoxy-polyesters, and epoxy-siloxane resins such as those described in Crivello, J. V. et al., *Journal of Polymer Science Part A: Polymer Chemistry*, 1990, 28, pages 479 to 503, and in Crivello, J. V. et al., *Chemistry of Materials*, 1989, 1, pages 445 to 451, the disclosures of each of which are totally incorporated herein by reference, epoxidized natural oils, such as epoxidized soybean oil, epoxidized linseed oil, epoxidized safflower oil, epoxidized corn oil, epoxidized cottonseed oil, epoxidized peanut oil, and the like, and epoxidized alkyl esters of oleic tall oil fatty acids (epoxytallates or epoxytofates). Further examples of suitable epoxy resins are described in *Encyclopedia of Polymer Science and Technology*, 2nd edition, Wiley Interscience, New York, pages 322 to 382 (1986) and in *Methoden Der Organischen Chemie*, Vol. E20 part 3, Georg Thiame Verlag Stuttgart, New York, pages 1891 to 1994 (1987), the disclosures of each of which are totally incorporated herein by reference.

Further examples of suitable curable materials include vinyl ether monomers, oligomers, or polymers containing vinyl ether groups of the general formula

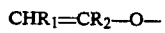

where $R_1$ and $R_2$ are hydrogen or alkyl groups with from 1 to about 10 carbon atoms, and preferably from 1 to 2 carbon atoms. Examples of such materials include decyl vinyl ether, dodecyl vinyl ether, hexadecyl vinyl ether, 4-chlorobutylvinyl ether, cyclohexyl vinyl ether, 1,4-cyclohexane dimethanol divinyl ether, diethylene glycol divinyl ether, butanediol divinyl ether, hexanediol divinyl ether, octanediol divinyl ether, decanediol divinyl ether. Further examples of vinyl ether monomers and polymers are shown in "Synthesis, Characterization, and Properties of Novel Aromatic Bispropenyl Ether" by J. V. Crivello and D. A. Conlon, *Journal of Polymer Science: Polymer Chemistry Edition*, Vol. 22, 2105–2121 (1984), "Aromatic Bisvinyl Ethers: A New Class of Highly Reactive Thermosetting Monomers" by J. V. Crivello and D. A. Conlon, *Journal of Polymer Science: Polymer Chemistry Edition*, Vol. 21, 1785–1799 (1983), "Vinyloxy-Functional Organopolysiloxane Compositions," by J. V. Crivello and R. P. Eckberg, U.S. Pat. No. 4,617,238, "Carbocationic Polymerization of Vinyl Ethers" by T. Higashimura, M. Sawamoto in *Comprehensive Polymer Science*, Vol. (3), pages 673 to 696, Pergamon Press (1989), "Polymerisation von Vinylethern" by J. Reiners in *Methoden Der Organischen Chemie*, Vol. E20 part 2, Georg Thiame Verlag Stuttgart, New York, pages 1071–1115 (1987), the disclosures of each of which are totally incorporated herein by reference. Cyclic vinyl ethers with the following basic structure

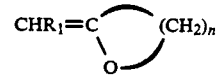

wherein $R_1$ is hydrogen or an alkyl group with from 1 to about 20 carbon atoms, and preferably from 1 to about 4 carbon atoms, and n=2 to about 20 and preferably from 3 to 8, are also useful, such as 4-phenyl-2-methylenetetrahydrofuran, 2-methylene-3,4-benzotetrahydrofuran, 2,2'-diphenyl-4-methylene-1,3-dioxolane, 2-methyl-2-phenyl-4-methylene-1,3-dioxolane and the like. Further examples can be found in "Ring-Opening Polymerization" by W. J. Bailey in *Comprehensive Polymer Science*, Vol. (3), pages 283 to 320 (1989), the disclosure of which is totally incorporated herein by reference.

Also suitable are styrene and indene monomers or oligomers, and polymers containing styrenic or indenic groups of the general formula

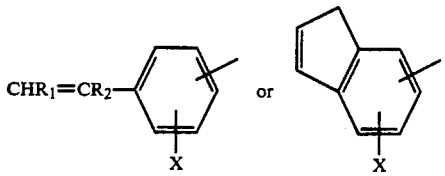

where $R_1$ and $R_2$ are H, alkyl, or aromatic groups, X is an electron donating group such as alkyl, alkoxy, N,N-dialkylamine groups and the like. The styrenic and indenic groups shown above can be attached to a polymer chain. Examples of such materials include butylstyrene, p-ethoxy styrene, p-butoxy styrene, p-octoxy styrene, o-allyloxystyrene, divinyl benzene, 1,4-bis(p-vinylbenzeneoxy)butane, 1,8-bis(p-vinylbenzeneoxy)octane, and the like. Further examples of styrene and indene monomers are disclosed in *Vinyl and Related Polymers*, by C. E. Schildknecht, Wiley and Sons, 1952, chapters 1, 2, and 3, and *Cationic Polymerization of Olefins: A Critical Inventory*, by J. P. Kennedy, Wiley and Sons, 1975, pages 228-330, the disclosures of each of which are totally incorporated herein by reference.

Also suitable are natural occurring unsaturated oils such as linseed oil, tung oil, oiticica oil, castor oil, fish oils, soybean oil, coconut oil, cottonseed oil, and the like. Natural occurring unsaturated resins are also suitable, such as manila resin, dammar resins, Congo and Kauri resins, Ester gum (glyceryl ester of rosin), phenolic resins, and the like. Further examples of naturally occurring materials of this type are disclosed in, for example, "Encyclopedia of Polymer Science and Engineering," "Coatings" volume 3, pages 615-675, by J. H. Lowell (1985), "Drying Oil" volume 5, pages 203 to 214, by Z. W. Wicks, Jr. (1986), and "Polymers from Renewable Sources" volume 12, pages 678 to 682, by L. H. Sperling and C. E. Carraher (1988) (Wiley & Sons), the disclosures of each of which are totally incorporated herein by reference.

In addition, vinyl acetal and ketene acetal monomers of the general formulae are suitable $$CHR_1=C\diagup^{O-R_2}_{O-R_3} \quad (I)$$

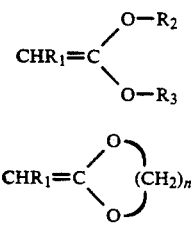

(II)

wherein $R_1$ is hydrogen or alkyl or aromatic groups with from 1 to about 20 carbon atoms, and preferably from 1 to about 6 carbon atoms, and $R_2$ and $R_3$ are alkyl or aromatic groups with from 1 to about 20 carbon atoms, and preferably from 1 to about 6 carbon atoms, $n=2$ to 20 and preferably from 3 to 8 as in the case of cyclic vinyl acetal (II). Typical examples include diethyl ketene acetal, di-butyl ketene acetal, diphenyl ketene acetal, 2-methylene-1,3-dioxepane, 4-phenyl-2-methylene-1,3-dioxepane, 4,6-dimethyl-2-methylene-1,3-dioxane 2-methylene-1,3-dioxe-5-pene, 4-vinyl-2-methylene-1,3-dioxzlane, and the like. Further examples are disclosed in "Ring-Opening Polymerization" by W. J. Bailey in *Comprehensive Polymer Science*, Vol. 3, pages 283 to 320 (1989), the disclosure of which is totally incorporated herein by reference.

Further, linear or branched aliphatic α-olefins, such as 1-dodecene, 5-methyl-1-heptene, 2,5-dimethyl-1,5-hexadiene, and the like, alicyclic olefins and diolefins, such as d-limonene, 1,4-dimethylenecyclohexane, 1-methylene-4-vinylcyclohexane, and the like, conjugated polyenes, such as 2-phenyl-1,3-butadiene, myrcene, allocimene, 1-vinylcyclohexene, ethylbenzofulvene, and the like, bicyclic olefins, such as α-pinene, β-pinene, 2-methylene-norbornane, and the like are all suitable carrier liquids. Further examples of these classes of olefins are disclosed in *Cationic Polymerization of Olefins: A Critical Inventory*, by J. P. Kennedy, Wiley and Sons, pages 1 to 228 (1975), the disclosure of which is totally incorporated herein by reference.

Liquid 1,2-polybutadiene resins and 1,4-polybutadiene resins of the formulae

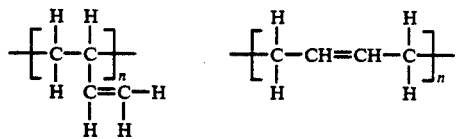

with a molecular weight between about 200 and about 3000, and preferably between about 200 and 1000, are also suitable. A thiol compound is generally present as the comonomers with the olefin monomers. Typical examples include trithiol trimethylolethane tris(β-mercaptopropionate), tetrathiol pentaerythritol tetrakis(thiogylcolate), dimonene dimercaptane, and the like.

Other curable materials include those that contain moieties such as cinnamic groups of the formula

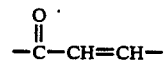

fumaric or maleic groups of the formula

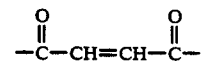

or maleimido groups of the formula

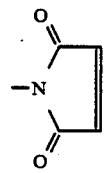

These functional groups can be present within either a monomer or a polymer comprising the liquid.

Specific examples include citrial, cinnamyl acetate, cinnamaldehyde, 4-vinylphenyl cinnamates, 4-vinylphenyl, 4-nitrocinnamate, 4-isopropenylphenyl cinnamate, poly[1-(cinnamoyloxymethylphenyl)ethylene], poly{1-(cinnamoyloxymethylphenyl)ethylene-co-1-[(4-nitrophenoxy)methylphenyl]ethylene}, 3-(2-furyl)acrolein), fumaric acid diethylester, fumaric acid dihexyl ester, maleic acid dibutylester, maleic acid diphenyl ester, N-phenyl maleinide, N-(4-butylphenyl) maleimide, m-phenylenediamine bis(maleimide), and N,N'-1,3 phenylenedimaleimide, and polyfunctional maleimide polymer MP-2000 from Kennedy and Klim, Little Silver, N.J.

In addition, monomers, dimers, or oligomers containing a multiplicity of one or more suitable functional groups can also be employed as the curable liquid.

Optionally, the curable liquid can contain a crosslinking agent. Crosslinking agents generally are monomers, dimers, or oligomers containing a multiplicity of functional groups, such as two styrene functionalities, a styrene functionality and an acrylate functionality, or the like. The curable liquid can consist entirely of these multifunctional monomers, dimers, or oligomers, can contain no crosslinking agent at all, and can contain both monofunctional monomers, dimers, or oligomers and multifunctional monomers or oligomers. Generally, the presence of a crosslinking agent is preferred to provide improved film forming characteristics, faster curing, and improved adhesion of the cured image to the substrate. When present, the crosslinking agent is present in an effective amount, typically from about 1 to about 100 percent by weight of the curable liquid and preferably from about 10 to about 50 percent by weight of the curable liquid.

Photopolymerization can be performed with the aid of an autoxidizer, which is generally a compound capable of consuming oxygen in a free radical chain process. Examples of useful autoxidizers include N,N-dialkylanilines, particularly those substituted in one or more of the ortho, meta, or para positions with groups such as methyl, ethyl, isopropyl, t-butyl, 3,4-tetramethylene, phenyl, trifluoromethyl, acetyl, ethoxycarbonyl, carboxy, carboxylate, trimethylsilylmethyl, trimethylsilyl, triethylsilyl, trimethylgermanyl, triethylgermanyl, trimethylstannyl, triethylstannyl, n-butoxy, n-pentyloxy, phenoxy, hydroxy, acetyl-oxy, methylthio, ethylthio, isopropylthio, thio-(mercapto-), acetylthio, fluoro, chloro, bromo, or iodo. Autoxidizers when present are present in an effective amount, typically from about 0.1 to about 5 percent by weight, of the curable liquid.

A UV sensitizer which could impart electron transfer, and exciplex-induced bond cleavage processes during radiation curing can, if desired, be included in the curable liquid of the present invention. Typical photosensitizers include anthrecene, perylene, phenothiazine, thioxanthone, benzophenone, fluorenone, and the like. The sensitizer is present in an effective amount, typically from about 0.1 to about 5 percent by weight, of the curable liquid. If desired, the UV sensitizer can be insoluble in the liquid vehicle and can be present on or in the solid particles containing the initiator.

Additional examples of curable liquids include those materials disclosed in, for example, U.S. Pat. Nos. 3,989,644, 4,264,703, 4,840,977, and 4,933,377, the disclosures of which are totally incorporated herein by reference.

Curing can be by any suitable means. Photoinitiated curing entails exposure of the curable liquid containing the polymeric initiator to radiation in the wavelength to which the polymeric initiator is sensitive, such as ultraviolet light. Examples of suitable ultraviolet lamps include low pressure mercury lamps, medium pressure mercury lamps, high pressure mercury lamps, xenon lamps, mercury xenon lamps, arc lamps, gallium lamps, lasers, and the like. Thermal initiated curing entails exposing the curable liquid containing the polymeric initiator to a temperature at which the initiator can initiate curing of the liquid and maintaining the liquid at that temperature for a period sufficient to cure the liquid. Electron beam curing can be initiated by any suitable electron beam apparatus. Examples include scanned beam apparatuses, in which electrons are generated nearly as a point source and the narrow beam is scanned electromagnetically over the desired area, such as those available from High Voltage Engineering Corporation, Radiation Dynamics, Inc. (a subsidiary of Monsanto Company), Polymer Physik of Germany, or the like, and linear-filament apparatuses or curtain processor apparatuses, in which electrons are emitted from a line-source filament and accelerated perpendicular to the filament in a continuous linear curtain, such as those available from Energy Sciences, Inc. under the trade name Electrocurtain. Ion beam curing can be initiated by any suitable means, such as a corotron.

One specific embodiment of the present invention is directed to curable liquid developer compositions comprising a colorant, a polymeric compound of the present invention, and a substantial amount of a curable liquid vehicle having a viscosity of no more than about 500 centipoise and a resistivity of no less than about $10^8$ ohm-cm.

Liquid developers and liquid development processes for the development of electrostatic latent images are also known. In electrophoretic developers and processes, the liquid developers generally comprise a liquid vehicle and colored toner particles, and frequently also contain a charge control agent. The colored toner particles become charged, and upon contacting the electrostatic latent image with the liquid developer, the particles migrate through the liquid vehicle toward the charged image, thereby effecting development. Any residual liquid vehicle remaining on the image subsequent to development is evaporated or absorbed into the receiving sheet. Typically, electrophoretic liquid developers employ hydrocarbon liquid vehicles, most commonly high boiling aliphatic hydrocarbons that are relatively high in resistivity and nontoxic. Developers and processes of this type are disclosed in, for example, U.S. Pat. Nos. 4,476,210, 2,877,133, 2,890,174, 2,899,335, 2,892,709, 2,913,353, 3,729,419, 3,841,893, 3,968,044, 4,794,651, 4,762,764, 4,830,945, 4,686,936, 4,766,049, 4,707,429, 4,780,388, 3,976,808, 4,877,698, 4,880,720 and 4,880,432, the disclosures of each of which are totally incorporated herein by reference. Electrophoretic liquid developers of the present invention employ curable liquids as the liquid vehicle. Typically, the electrophoretic liquid developers of the present invention comprise a substantial amount of a curable liquid vehicle having a resistivity of no less than about $5 \times 10^9$ ohm-cm and a viscosity of no more than about 20 centipoise, a charge control agent, a polymeric initiator compound of the present invention, and colored particles capable of becoming charged and migrating through the liquid vehicle to develop an electrostatic latent image.

In polarizable liquid development processes, as disclosed in U.S. Pat. No. 3,084,043 (Gundlach), the disclosure of which is totally incorporated herein by reference, liquid developers having relatively low viscosity and low volatility and relatively high electrical conductivity (relatively low volume resistivity) are deposited on a gravure roller to fill the depressions in the roller surface. Excess developer is removed from the lands between the depressions, and as a receiving surface charged in image configuration passes near the gravure roller, liquid developer is attracted from the depressions onto the receiving surface in image configuration by the charged image. Developers and processes of this type are disclosed in, for example, U.S. Pat. Nos. 4,047,943, 4,059,444, 4,822,710, 4,804,601, 4,766,049, Canadian Patent 937,823, Canadian Patent 926,182, Canadian Patent 942,554, British Patent 1,321,286, and British Patent 1,312,844, the disclosures of each of which are totally incorporated herein by reference. Polarizable liquid developers of the present invention employ curable liquids as the liquid vehicle. Typically, the polarizable liquid developers of the present invention comprise a colorant, a polymeric initiator compound of the present invention, and a substantial amount of a curable liquid vehicle having a resistivity of from about $10^8$ to about $10^{11}$ ohm-cm and a viscosity of from about 25 to about 500 centipoise.

In photoelectrophoretic liquid development processes, as disclosed in, for example, U.S. Pat. Nos. 4,135,925, 3,383,993, 3,384,488, 3,384,565, 3,384,566, 4,043,655, and 4,023,968, the disclosures of each of which are totally incorporated herein by reference, colored photosensitive toner particles are suspended in an insulating carrier liquid. The suspension is placed between at least two electrodes subjected to a potential difference and exposed to a light image. Typically, the imaging suspension is placed on a transparent electrically conductive support in the form of a thin film and exposure is made through the transparent support while a second biased electrode is rolled across the suspension. It is believed that the particles bear an initial charge once suspended in the liquid carrier which causes them to be attracted to the transparent base electrode upon application of the potential difference. Upon exposure, the particles change polarity by exchanging charge with the base electrode so that the exposed particles migrate to the second or roller electrode, thereby forming images on each of the electrodes by particle subtraction, each image being complementary one to the other. Both polychromatic and monochromatic images can be formed by the process; when polychromatic images are prepared, the liquid developer can contain toner particles of more than one color. Photoelectrophoretic liquid developers of the present invention employ curable liquids as the liquid vehicle. Typically, the photoelectrophoretic liquid developers of the present invention comprise a substantial amount of a curable liquid vehicle having a resistivity of no less than about $5 \times 10^9$ ohm-cm and a viscosity of no more than about 20 centipoise, a polymeric initiator compound of the present invention, and photosensitive colored particles.

The curable liquid selected as the liquid vehicle for developer compositions of the present invention can be any suitable liquid having the desired resistivity and viscosity characteristics and capable of becoming cured to form a solid. When the liquid developer is intended for use in electrophoretic development or photoelectrophoretic development systems, the liquid vehicle must be capable of permitting the colored toner particles of the developer to migrate through the vehicle to develop electrostatic latent images. Thus, in electrophoretic and photoelectrophoretic developers, the liquid vehicle is sufficiently high in resistivity to enhance the development of particles over that of free ions, typically having a resistivity of more than about $5 \times 10^9$ ohm-cm and preferably more than about $10^{10}$ ohm-cm as measured by determining the average current flowing across a 1.5 millimeter gap at 5 hertz and 5 volts square wave applied potential. In addition, the liquid vehicle is sufficiently low in viscosity to permit the toner particles to migrate toward the electrostatic latent image with sufficient rapidity to enable development of the image within the desired development time. Typically, the liquid vehicle has a viscosity of no more than about 20 centipoise at the operating temperature of the copier or printer, and preferably no more than about 3 centipoise at the machine operating temperature.

When the liquid developer is intended for use in a polarizable liquid development system, the liquid developer is applied to an applicator such as a gravure roll and brought near an electrostatic latent image. The charged image polarizes the liquid developer in the depressions in the applicator, thereby drawing the developer from the depressions and causing it to flow to the image bearing member to develop the image. For this application, the liquid vehicle of the liquid developer is somewhat more viscous than is the situation with electrophoretic development, since particle migration within the developer is generally not necessary and since the liquid developer must be sufficiently viscous to remain in the depressions in the applicator prior to development. The viscosity, however, remains significantly lower than that typically observed for many printing inks, since the liquid developer must be capable of being pulled from the depressions in the applicator roll by the force exerted by the electrostatic latent image. Thus, liquid developers for use in polar development systems typically have a viscosity of from about 25 to about 500 centipoise at the operating temperature of the copier or printer, and preferably from about 30 to about 300 centipoise at the machine operating temperature. In addition, liquid developers intended for use in polarizable liquid development systems typically have a resistivity lower than liquid developers employed in electrophoretic or photoelectrophoretic development systems to enable the developer to become polarized upon entering proximity with the electrostatic latent image. The liquid developers of the present invention, however, generally have resistivities that are significantly higher than the resistivities of typical printing inks, for which resistivities generally are substantially less than about $10^9$ ohm-cm. Typically, liquid developers for polarizable liquid development systems have a resistivity of from about $10^8$ to about $10^{11}$ ohm-cm, and preferably from about $2 \times 10^9$ to about $10^{10}$ ohm-cm.

The polymeric initiator compound of the formula

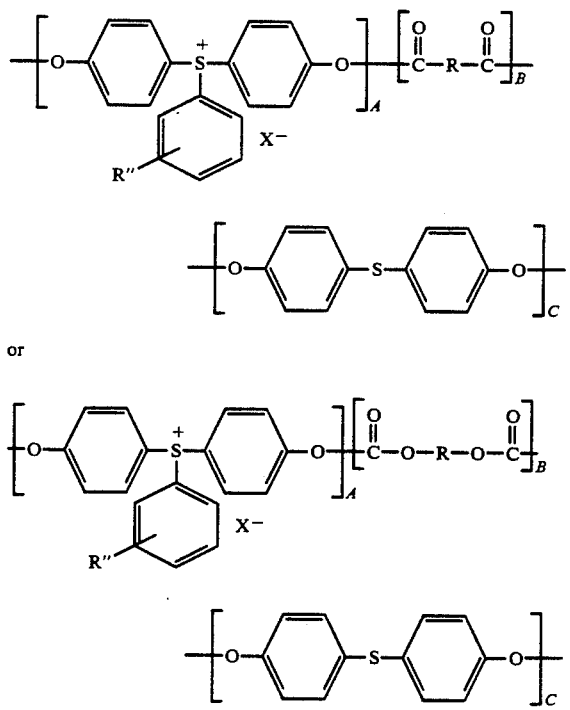

wherein X is an anion with weak nucleophilicity, R is selected from the group consisting of hydrocarbon groups and alkylene ether groups, and R″ is selected from the group consisting of hydrogen, nitro, amide, halide, trimethylsilyl, alkyl groups, and alkoxy groups, is present in the liquid developers of the present invention in any effective amount. Typically, this initiator compound is present in an amount of from about 1 to about 20 percent by weight of the curable liquid used in the developer, and preferably from about 1 to about 10 percent by weight of the curable liquid used in the developer, although the amount can be outside of these ranges.

The liquid developers of the present invention can also include a charge control agent to help impart a charge to the colored toner particles. A charge control additive is generally present in the electrophoretic liquid developers and the photoelectrophoretic liquid developers of the present invention to impart to the particles contained in the liquid a charge sufficient to enable them to migrate through the liquid vehicle to develop an image. Examples of suitable charge control agents for liquid developers include the lithium, cadmium, calcium, manganese, magnesium and zinc salts of heptanoic acid; the barium, aluminum, cobalt, manganese, zinc, cerium and zirconium salts of 2-ethyl hexanoic acid, (these are known as metal octoates); the barium, aluminum, zinc, copper, lead and iron salts of stearic acid; the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum resinate, aluminum salt of 3,5 di-t-butyl gamma resorcylic acid. Mixtures of these materials may also be used. Particularly preferred charge control agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc with heptanoic acid; salts of barium, aluminum, cobalt, manganese, zinc, cerium, and zirconium octoates; salts of barium, aluminum, zinc, copper, lead, and iron with stearic acid; iron naphthenate; and the like, as well as mixtures thereof. The charge control additive may be present in an amount of from about 0.001 to about 3 percent by weight, and preferably from about 0.01 to about 0.8 percent by weight of the developer composition. Other additives, such as charge adjuvants added to improve charging characteristics of the developer, may be added to the developers of the present invention, provided that the objectives of the present invention are achieved. Charge adjuvants such as stearates, metallic soap additives, polybutylene succinimides, and the like are described in references such as U.S. Pat. Nos. 4,707,429, 4,702,984, and 4,702,985, the disclosures of each of which are totally incorporated herein by reference.

Generally, the liquid component of the liquid developers of the present invention is present in a large amount, and constitutes that percentage by weight of the developer not accounted for by the solid components. The liquid vehicle is usually present in an amount of from about 80 to about 99 percent by weight, although the amount may vary from this range provided that the objectives of the present invention are achieved.

The liquid developers of the present invention can contain any kind of colored toner particle typically used in conventional liquid developers and compatible with the liquid vehicle. For example, the toner particles can consist solely of pigment particles dispersed in the liquid vehicle. Since the liquid vehicle is cured to a solid before, or after transfer, the pigment particles can become affixed to the print substrate by the cured liquid vehicle, and no additional polymeric component is required in the developer for fixing purposes. If desired, however, a polymeric component can be present in the developer. The polymer can be soluble in the liquid vehicle, and can include polymers such as poly(2-ethyl hexylmethacrylate); poly(isobutylene-co-isoprenes), such as Kalene 800, available from Hardman Company, N.J.; polyvinyl toluene-based copolymers, including vinyl toluene acrylic copolymers such as Pliolite OMS, Pliolite AC, Pliolite AC-L, Pliolite FSA, Pliolite FSB, Pliolite FSD, Pliolite FSE, Pliolite VT, Pliolite VT-L, Pliolite VTAC, and Pliolite VTAC-L, available from the Goodyear Tire and Rubber Company, Neocryl S-1002 and EX519, available from Polyvinyl Chemistry Industries, Parapol 900, Parapol 1300, and Parapol 2200, available from Exxon Company, and the like; block copolymers such as poly(styrene-b-hydrogenated butadiene), including Kraton G 1701, available from Shell Chemical Company; and the like, as well as mixtures thereof, as disclosed in, for example, copending application U.S. application Ser. No. 07/369,003, the disclosure of which is totally incorporated herein by reference. In addition, the polymer can be insoluble in the liquid vehicle, and can be present either as separate particles or as an encapsulating shell around the pigment particles. Examples of suitable polymers in this instance include ethylene-vinyl acetate copolymers such as the Elvax ® I resins available from E. I. Du Pont de Nemours & Company, copolymers of ethylene and an $\alpha,\beta$-ethylenically unsaturated acid selected from acrylic or methacrylic acid, where the acid moiety is present in an amount of from 0.1 to 20 percent by weight, such as the Nucrel ® II resins available from E. I. Du Pont de Nemours & Company, polybutyl terephthalates, ethylene ethyl acrylate copolymers such as those available as Bakelite DPD 6169, DPDA 6182 Natural, and DTDA 9169 Natural from Union Carbide Company, ethylene vinyl acetate resins such as DQDA 6479 Natural 7 and DQDA 6832 Natural 7 available from Union Carbide Company, methacrylate resins such as polybutyl methacrylate, polyethyl methacrylate, and polymethyl methacrylate, available under the trade name Elvacite from E. I. Du Pont de Nemours & Company, and others as disclosed in, for example, British Patent 2,169,416 and U.S. Pat. No. 4,794,651, the disclosures of which are totally incorporated herein by reference. Further, the polymer can be partially soluble in the liquid vehicle, or soluble in the vehicle at elevated temperatures of, for example, over 75° C. and insoluble at ambient temperatures of, for example, from about 10° C. to about 65° C. Examples of suitable polymers in this instance include polyolefins and halogenated polyolefins, such as chlorinated polypropylenes and poly-$\alpha$-olefins, including polyhexadecenes, polyoctadecenes, and the like, as disclosed in copending application U.S. application Ser. No. 07/300,395, the disclosure of which is totally incorporated herein by reference.

Suitable pigment materials include carbon blacks such as Microlith ® CT, available from BASF, Printex ® 140 V, available from Degussa, Raven ® 5250 and Raven ® 5720, available from Columbian Chemicals Company, and Mogul-L, Black Pearls L, and the Regal carbon blacks from Cabot Corporation. Pigment materials may be colored, and may include magenta pigments such as Hostaperm Pink E (Hoechst Celanese Corporation) and Lithol Scarlet (BASF), yellow pigments such as Diarylide Yellow (Dominion Color Company), cyan pigments such as Sudan Blue OS (BASF), and the like. Generally, any pigment material is suitable provided that it consists of small particles and that it either combines well with any polymeric material also included in the developer composition or is suitable in itself as a toner particle in that it is of the desired particle size and, in the electrophoretic and photoelectrophoretic embodiments of the present invention, is capable of becoming charged and migrating through the liquid vehicle to develop an image. The pigment particles are present in an amount sufficient to enable development of a colored image, typically from about 5 to about 100 percent by weight of the solids content of the developers of the present invention. Polymeric components of the solids portion of the developers, when present, are present in any amount up to about 95 percent by weight of the solids component of the liquid developers of the instant invention.

Examples of photosensitive pigments suitable for use in the photoelectrophoretic liquid developers of the present invention are disclosed in, for example, U.S. Pat. No. 3,384,488, the disclosure of which is totally incorporated herein by reference. This patent also discloses additional materials, such as charge transfer materials, that can be contained in the photoelectrophoretic liquid developers of the present invention.

Additional references disclosing suitable toner particles include U.S. Pat. Nos. 4,794,651, 4,762,764, 3,729,419, 3,841,893, and 3,968,044, the disclosures of each of which are totally incorporated herein by reference.

In embodiments of the present invention such as liquid developers and processes employing polarizable liquid development, the developer can contain a dye instead of pigment particles. Further, in embodiments of the present invention wherein colored particles migrate through the liquid medium to form images, the particles can be colored with a dye instead of with a pigment. Suitable dyes include Orasol Blue 2GLN, Red G, Yellow 2GLN, Blue GN, Blue BLN, Black CN, Brown CR, all available from Ciba-Geigy, Inc., Mississauga, Ontario, Morfast Blue 100, Red 101, Red 104, Yellow 102, Black 101, Black 108, all available from Morton Chemical Company, Ajax, Ontario, Bismark Brown R, available from Aldrich, Neolan Blue, available from Ciba-Geigy, Savinyl Yellow RLS, Black RLS, Red 3GLS, Pink GBLS, all available from Sandoz Company, Mississauga, Ontario, and the like. Dyes generally are present in an amount of from about 5 to about 30 percent by weight of the toner particle, although other amounts may be present provided that the objectives of the present invention are achieved.

The liquid developers of the present invention can also contain various polymers added to modify the viscosity of the developer or to modify the mechanical properties of the developed or cured image such as adhesion or cohesion. In particular, when the liquid developer of the present invention is intended for use in polarizable liquid development processes, the developer can also include viscosity controlling agents. Examples of suitable viscosity controlling agents include thickeners such as alkylated polyvinyl pyrrolidones, such as Ganex V216, available from GAF; polyisobutylenes such as Vistanex, available from Exxon Corporation, Kalene 800, available from Hardman Company, New Jersey, ECA 4600, available from Paramins, Ontario, and the like; Kraton G-1701, a block copolymer of polystyrene-b-hydrogenated butadiene available from Shell Chemical Company, Polypale Ester 10, a glycol rosin ester available from Hercules Powder Company; and other similar thickeners. In addition, additives such as pigments, including silica pigments such as Aerosil 200, Aerosil 300, and the like available from Degussa, Bentone 500, a treated montmorillonite clay available from NL Products, and the like can be included to achieve the desired developer viscosity. Additives are present in any effective amount, typically from about 1 to about 40 percent by weight in the case of thickeners and from about 0.5 to about 5 percent by weight in the case of pigments and other particulate additives.

In addition, liquid developers of the present invention intended for use in polarizable liquid development processes can also contain conductivity enhancing agents. For example, the developers can contain additives such as quaternary ammonium compounds as disclosed in, for example, U.S. Pat. No. 4,059,444, the disclosure of which is totally incorporated herein by reference.

The liquid developers of the present invention generally can be prepared by any method suitable for the type of toner particles selected. For example, when the toner ingredients comprise a polymer and a pigment, the developer can be prepared by mixing the ingredients, followed by grinding the mixture in an attritor in the presence of the selected liquid vehicle. When the solids content of the developer contains pigment particles and a polymer soluble in the liquid vehicle at elevated temperatures and insoluble at ambient temperatures, the polymer can be dispersed by heating the mixture, grinding the mixture in an attritor at elevated temperatures, and grinding while the mixture cools. Methods of preparing various kinds of liquid developers are disclosed in several of the documents previously incorporated herein by reference, including U.S. Pat. Nos. 4,476,210, 4,794,651, 4,877,698, 4,880,720, and 4,880,432. The charge control agent can be added to the mixture either during mixing of the other ingredients or after the developer has been prepared. Similarly, the polymeric initiator that enables curing of the liquid vehicle can either be added with the other developer ingredients or at a later time, including immediately before use of the developer. Further, in another embodiment of the present invention, the liquid developer contains little or no initiator during the development step, and the initiator is added to the developed image. This can be accomplished in any suitable manner, such as by spraying the developed image with the initiator, by incorporating the initiator into the substrate on which the final image will be contained, by applying the initiator as an undercoat or an overcoat, or the like. Additionally, the liquid developer can contain little or no crosslinking agent during the development step, and the crosslinking agent can be added to the developed image in any suitable manner.

In general, images are developed with the liquid electrophoretic developers and the polarizable liquid developers of the present invention by generating an electrostatic latent image and contacting the latent image with the liquid developer, thereby causing the image to be developed. When a liquid electrophoretic developer of the present invention is employed, the process entails generating an electrostatic latent image and contacting the latent image with the developer comprising a liquid vehicle and charged toner particles, thereby causing the charged particles to migrate through the liquid and develop the image. Developers and processes of this type are disclosed in, for example, U.S. Pat. Nos. 4,804,601, 4,476,210, 2,877,133, 2,890,174, 2,899,335, 2,892,709, 2,913,353, 3,729,419, 3,841,893, 3,968,044, 4,794,651, 4,762,764, 4,830,945, 3,976,808, 4,877,698, 4,880,720, and 4,880,432, the disclosures of each of which are totally incorporated herein by reference. When a liquid developer of the present invention suitable for polarizable liquid development processes is employed, the process entails generating an electrostatic latent image on an imaging member, applying the liquid developer to an applicator, and bringing the applicator into sufficient proximity with the latent image to cause the image to attract the developer onto the imaging member, thereby developing the image. Developers and processes of this type are disclosed in, for example, U.S. Pat. Nos. 4,047,943, 4,059,444, 4,822,710, 4,804,601, 4,766,049, 4,686,936, 4,764,446, Canadian Patent 937,823, Canadian Patent 926,182, Canadian Patent 942,554, British Patent 1,321,286, and British Patent 1,312,844, the disclosures of each of which are totally incorporated herein by reference. In both of these embodiments, any suitable means can be employed to generate the image. For example, a photosensitive imaging member can be exposed by incident light or by laser to generate a latent image on the member, followed by development of the image and transfer to a substrate such as paper, transparency material, cloth, or the like. In addition, an image can be generated on a dielectric imaging member by electrographic or ionographic processes as disclosed, for example, in U.S. Pat. Nos. 3,564,556, 3,611,419, 4,240,084, 4,569,584, 2,919,171, 4,524,371, 4,619,515, 4,463,363, 4,254,424, 4,538,163, 4,409,604, 4,408,214, 4,365,549, 4,267,556, 4,160,257, 4,485,982, 4,731,622, 3,701,464, and 4,155,093, the disclosures of each of which are totally incorporated herein by reference, followed by development of the image and, if desired, transfer to a substrate. If necessary, transferred images can be fused to the substrate by any suitable means, such as by heat, pressure, exposure to solvent vapor or to sensitizing radiation such as ultraviolet light or the like as well as combinations thereof. Further, the liquid developers of the present invention can be employed to develop electrographic images wherein an electrostatic image is generated directly onto a substrate by electrographic or ionographic processes and then developed, with no subsequent transfer of the developed image to an additional substrate.

The photoelectrophoretic liquid developers of the present invention can be employed in photoelectrophoretic development processes, which generally entail placing a suspension of electrically photosensitive particles in a fluid between two electrodes, at least one of which is generally a substantially transparent plate. Exposure of the suspension to a light image while a field is applied between the electrodes causes the formation of an image by deposition of the suspended particles in imagewise configuration on the electrode. In one embodiment, as disclosed, for example, in U.S. Pat. No. 4,043,655, both electrodes are transparent plates. In another embodiment, as disclosed, for example, in U.S. Pat. No. 4,023,968, one electrode is a transparent conductive support and the other is a generally cylindrically shaped biased electrode that is rolled across the first electrode upon which has been placed the suspension of photosensitive particles. Multicolor images can be made by, among other methods, employing a developer containing photosensitive particles of all desired colors and sequentially exposing the suspension to light images through color filters. Photoelectrophoretic processes are described in detail in, for example, U.S. Pat. Nos. 4,043,655, 4,023,968, 4,066,452, 3,383,993, 3,384,566, 3,384,565, and 3,384,488, the disclosures of each of which are totally incorporated herein by reference. Photoelectrophoretic liquid developers of the present invention can be prepared by preparing any of the liquid photoelectrophoretic developers disclosed in these patents with the exception that the liquid vehicle is replaced with a curable liquid so that the resulting developer has the desired resistivity and viscosity characteristics.

Subsequent to development of the image with the liquid developer of the present invention, the image is cured, causing residual liquid vehicle on the image to solidify. Curing can take place before transfer or after transfer. In situations such as electrographic imaging wherein the image is developed directly on the substrate and no transfer occurs, the image is cured subsequent to development. When transfer to a substrate is desired, the developed image can be partially cured prior to transfer; partial curing can impart tacky surface characteristics to the developed image, which can enhance transfer to a substrate. In addition, curing subsequent to transfer can greatly enhance adhesion of the image to the substrate, since the liquid vehicle can penetrate the substrate, particularly when the substrate is porous such as cloth or paper, and curing results in the image being tightly bound to the fibers of the substrate. In addition, curing subsequent to transfer can greatly enhance adhesion to the substrate, whether the substrate is smooth or porous, when the substrate has reactive sites, either naturally occurring as in cellulose or clays, or added as a precoating, with which reactive species in the liquid developer can react.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

To a hot solution (80° to 90° C.) of diphenyliodonium chloride (5.0 grams, 0.016 moles, obtained from Aldrich) in water (200 grams) was added a solution of potassium hexafluoroarsenate (4.3 grams, 0.019 moles, obtained from Pfaltz & Bauer)in water (34 grams). A white precipitate formed immediately. After stirring for 10 minutes, the solid was collected by suction filtration and then air dried to yield diphenyliodonium hexafluoroarsenate (4.4 grams, 47 percent yield). This crude product, which can be purified by recrystallization from acetone/ethanol, can also be used directly for reaction with a diphenyl sulfide polymer to form the corresponding sulfonium polymer.

EXAMPLE II

To ice-cooled magnetically stirring acetic anhydride (81.0 grams) was gradually added ice cold concentrated sulfuric acid (66 grams). Most of the resulting solution (145 grams)was transferred into a 250 milliliter addition funnel which was fitted to a 1 liter three-necked round bottom flask containing potassium iodate (60 grams), acetic anhydride (65 grams), t-butylbenzene (80.4 grams), and a magnetic stirring bar. The contents of the flask were cooled to −5° C. with a sodium chloride/ice bath. The acetic anhydride/sulfuric acid solution was added slowly over 1.5 hours, keeping the temperature below 5° C. The mixture was stirred at room temperature for 92 hours. The resulting mixture was cooled to 5° C. before gradual addition of crushed ice (120 grams), keeping the temperature below 10° C. The reaction mixture was then poured into a stirring ice (300 grams)/water (1,200 grams) mixture. Stirring was continued for 5 minutes and then stopped. After 30 minutes standing, the water layer was decanted. To the remaining mixture was added a solution of potassium hexafluoroarsenate (90 grams)in water (210 grams) while stirring. The mixture gummed up after 2 to 3 minutes. The aqueous layer was then decanted into a beaker. Ethyl ether (200 milliliters) was added to solubilize the gummy material. The decanted aqueous layer was added back into the ether solution. Stirring was continued until precipitation occurred. After another 10 minutes of stirring, the aqueous layer was decanted and additional ethyl ether(150 milliliters) was added. The resulting mixture was stirred for 5 minutes. The white precipitate was collected by suction filtration, washed with ether, and then vacuum dried in the dark to yield 93 grams of crude 4,4'-di-t-butylphenyliodonium hexafluoroarsenate. This material was then dissolved in methylene chloride (700 milliliters) and the resulting solution was extracted with water (3×500 milliliters), dried through $Na_2SO_4$, and concentrated under vacuum. The residual solid was recrystallized from 1:1 hexanes/chloroform to give 4,4'-di-t-butyldiphenyliodonium hexafluoroarsenate as white crystals (62.6 grams, melting point 180° C.)in three crops.

EXAMPLE III 4,4'-di-iso-butylphenyliodonium hexafluoroarsenate was prepared following the procedure described in Example II using iso-butylbenzene instead of t-butylbenzene. The work-up procedure for this reaction is as follows: After the addition of potassium hexafluoroarsenate (90 grams) in water (210 grams), the mixture was stirred for 15 minutes. Methylene chloride (400 milliliters) and water (220 milliliters) were then added and the entire mixture was transferred into a separatory funnel. The organic phase was extracted with water until the pH was neutral, followed by drying through $Na_2SO_4$ and concentrating under vacuum to yield a yellow oil (91 grams), which was purified by passing through neutral Alumina (120 grams) packed with methylene chloride. After removal of solvent and pumping under vacuum, a light yellow oil (84.5 grams) was obtained.

EXAMPLE IV

An aqueous solution containing 4,4'-thiodiphenol was prepared as follows: A mixture of 4,4'-thiodiphenol (2.3 grams, 0.01 mole), 4-hexylresorcinol (1.8 grams, 0.0093 mol), 45 percent potassium hydroxide solution (5.4 grams, 0.043 mole), potassium bicarbonate (0.8 gram), and ice water (29.0 grams)in a 150 milliliter polypropylene bottle was shaken by a wrist action shaker until complete dissolution occurred. To a vigorously stirring solution of isophthaloyl dichloride (4 grams, 0.0197 mol)in methylene chloride (40 milliliters) was added an aqueous solution of benzyl triethylammonium chloride (0.08 grams) in water (24 milliliters). To the resulting mixture was added the 4,4'-thiodiphenol solution all at once. After stirring for 10 minutes, an aqueous solution which was prepared from t-butylphenyl (0.3 grams), 45 percent potassium hydroxide solution (0.3 grams), and water (1 milliliter)in a small vial was added. Stirring was continued for 50 minutes. The reaction mixture was transferred into a separatory funnel. The bottom organic layer was added dropwise into vigorously stirring methanol (500 milliliters). The precipitated polymer was collected by suction filtration and then vacuum dried at 55° C. to yield a polyester (6.1 grams, 92 percent yield).

EXAMPLE V

An aqueous solution containing 4,4'-thiodiphenol was prepared as follows: A mixture of 4,4'-thiodiphenol (3.2 grams, 0.0147 mole), 4-hexylresorcinol (1.0 gram, 0.005 mil), 45 percent potassium hydroxide solution (5.4 grams, 0.043 mole), potassium bicarbonate (0.8 gram), and ice water (29 grams)in a 150 milliliter polypropylene bottle was shaken by a wrist action shaker until complete dissolution occurred. To a vigorously stirring solution of isophthaloyl dichloride (4 grams, 0.0197 mol) in methylene chloride (40 milliliters) was added an aqueous solution of benzyl triethylammonium chloride (0.08 gram)in water (24 milliliters). To the resulting mixture was added the 4,4'-dithiodiphenol solution all at once. After stirring for 10 minutes, an aqueous solution comprising t-butylphenol (0.3 gram), 45 percent potassium hydroxide solution (0.3 gram), and water (1 milliliter) was added. Stirring was continued for 50 minutes. The reaction mixture was transferred into a separatory funnel. The bottom organic layer was added dropwise into stirring methanol (500 milliliters). The precipitated polymer was collected by suction filtration, washed with methanol, and then vacuum dried at 55° C. to yield a polyester (6.6 grams, 98 percent yield).

EXAMPLE VI

A mixture of the polyester prepared in Example IV (2.0 grams), 4,4'-di-t-butyldiphenyliodonium hexafluoroarsenate as prepared in Example II (0.7 gram), cupric benzoate (0.01 gram), and chlorobenzene (7 milliliters) was heated at 140° C. for 5 hours and then cooled. The resulting viscous oil was diluted with chloroform (10 milliliters). The solution was quantitatively transferred into a separatory funnel and then added dropwise into stirring methanol (250 milliliters). The wet product mass was then transferred into a small bottle. Chloroform (10 milliliters)was added and the mixture was shaken for 15 minutes. During this time, the product coagulated to form a soft ball. The solvent was decanted, followed by addition of chloroform (10 milliliters). The resulting mixture was shaken for 25 minutes to form a solution which was transferred back into the addition funnel and then added dropwise into stirring methanol (250 milliliters). The precipitated polymer was collected by suction filtration followed by vacuum drying at 55° C. for 4 hours to yield a polymeric initiator (2.2 grams). The initiator (1.0 gram) was dissolved in methylene chloride (4 grams). A fraction of this solution was cast upon a Mylar ® substrate to form a thin layer of initiator coating. Upon this coating was deposited a wet layer of a vinyl ether mixture comprising a 70:30 ratio by weight of n-decyl vinyl ether and 1,4-cyclohexanedimethanol divinyl ether. The wet layer was completely cured after passing through a Hanovia UV-6 operating at 270 watts and 18 feet per minute.

EXAMPLE VII

A mixture of the polyester prepared in Example V (2.0 grams), 4,4'-di-t-butyldiphenyliodonium hexafluoroarsenate (1.0 gram), cupric benzoate (0.0135 gram), and chlorobenzene (8 milliliters) was heated at 140° C. for 5 hours and then cooled. Chloroform (10 milliliters) was added to the viscous reaction residue, the resulting solution was transferred into a separatory funnel and added dropwise into stirring methanol (250 milliliters). The product mass was transferred into a bottle and chloroform (10 milliliters)was added. The mixture was shaken for 15 minutes. Most of the solvent was decanted, followed by addition of chloroform (10 milliliters). After shaking for 10 minutes, the product coagulated into a ball. The solvent was decanted and chloroform (10 milliliters) was added. The mixture was shaken for 15 minutes to form a solution, which was then transferred into a separatory funnel and added dropwise into stirring methanol (250 milliliters). The precipitated polymer was collected by suction filtration, followed by vacuum drying at 55° C. for 2.5 hours to yield a polymeric initiator (1.3 grams). A fraction of the polymer (0.5 gram) was dissolved in methylene chloride (2 grams). A fraction of this solution was used to cast a thin polymer layer on a Mylar ® substrate. Upon this polymer layer was cast a wet layer of a vinyl ether mixture comprising a 70:30 weight ratio of n-decylvinyl ether and 1,4-cyclohexanedimethanol divinyl ether. The wet layer was cured completely after passing through the Hanovia UV-6 operating at 270 Watts and 18 feet per minute.

EXAMPLE VIII

A mixture of the polyester prepared in Example V (2.0 grams), 4,4'-di-t-butyldiphenyliodonium hexafluoroarsenate (0.5 grams), cupric benzoate (0.0067 gram), and chlorobenzene (8 milliliters) was heated at 140° C. for 16 hours and then cooled. A polymer (1.3 grams) was isolated according to the procedure set forth in Example VII. A fraction (0.5 gram) of the polymer was dissolved in methylene chloride (2.0 grams) and the solution was used to cast a thin layer of the polymer onto a Mylar ® substrate. Upon this polymer layer was cast a wet layer of a vinyl ether mixture comprising a 70:30 weight ratio of n-decylvinyl ether and 1,4-cyclohexanedimethanol divinyl ether. The wet layer was cured completely after passing through the Hanovia UV-6 operating at 270 Watts and 18 feet per minute.

EXAMPLE IX

A mixture of the polyester prepared in Example V (2.0 grams), 4,4'-di-t-butyldiphenyliodonium hexafluoroarsenate (0.5 gram), cupric benzoate (0.0067 gram), and chlorobenzene (8 milliliters) was heated at 140° C. for 16 hours under nitrogen atmosphere. A polymer (1.3 grams) was isolated according to the procedure set forth in Example VII. A fraction (0.5 gram) of the polymer was dissolved in methylene chloride (2.0 grams). This solution was used to cast a thin layer of the polymer onto a Mylar ® substrate. Upon this polymer layer was cast a wet layer of a vinyl ether mixture comprising a 70:30 weight ratio of n-decylvinyl ether and 1,4-cyclohexanedimethanol divinyl ether. The wet layer did not cure after passing through the Hanovia UV-6 operating at 270 Watts and 18 feet per minute. These results indicate that the presence of a nitrogen atmosphere during the preparation of the polymeric initiator of the present invention is not necessarily desirable.

EXAMPLE X

A mixture of the polyester prepared according to Example V (4.0 grams), 4,4'-di-t-butyldiphenyliodonium hexafluoroarsenate (0.5 gram), cupric benzoate (0.027 gram), and chlorobenzene was heated under nitrogen atmosphere at 140° C. for 5.5 hours and then cooled. A polymer (2.5 grams) was isolated according to the procedure described in Example VII. A fraction of the polymer (0.5 gram) was dissolved in methylene chloride (2.0 grams) and the resulting solution was used to coat a thin polymer layer onto a Mylar ® substrate. Upon this polymer layer was cast a wet layer of a vinyl ether mixture comprising a 70:30 weight ratio of n-decylvinyl ether and 1,4-cyclohexanedimethanol divinyl ether. The wet layer did not cure after passing through the Hanovia UV-6 operating at 270 Watts and 18 feet per minute. These results indicate that the presence of a nitrogen atmosphere during the preparation of the polymeric initiator of the present invention is not necessarily desirable.

Other embodiments and modifications of the present invention may occur to those skilled in the art subsequent to a review of the information presented herein; these embodiments and modifications, as well as equivalents thereof, are also included within the scope of this invention.

What is claimed is:

1. A compound of the formula

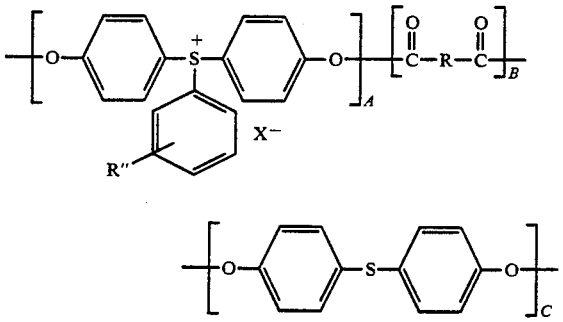

wherein X is an anion with weak nucleophilicity, A, B, and C represent the number of monomer units, wherein C may be zero. R is selected from the group consisting of hydrocarbon groups and alkylene ether groups, and R" is selected from the group consisting of hydrogen, nitro, amide, halide, trimethylsilyl, alkyl groups, and alkoxy groups; or

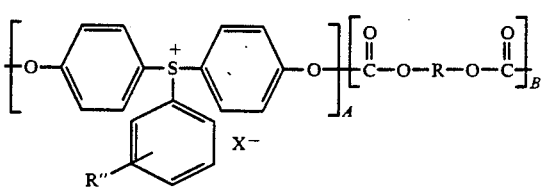

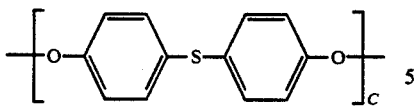

wherein X is an anion with weak nucleophilicity, A, B, and C represent the number of monomer units, wherein R is selected from the group consisting of hydrocarbon groups and alkylene ether groups, and R" is selected from the group consisting of hydrogen, nitro, amide, halide, trimethylsilyl, alkyl groups, and alkoxy groups, and wherein the compound contains A monomers, B monomers, and C monomers.

2. A compound according to claim 1 wherein X is selected from the group consisting of $AsF_6^-$, $SbF_6^-$, $PF_6^-$, $CF_3SO_3^-$, $BF_4^-$, $HSO_4^-$, $CF_3COO^-$, $NO_2-C_6H_4-SO_3^-$, and mixtures thereof.

3. A compound according to claim 1 wherein R is selected from the group consisting of alkyl groups with from about 1 to about 22 carbon atoms, aryl groups with from about 6 to about 50 carbon atoms, and alkylene ether groups wherein the alkylene groups have from about 1 to about 10 carbon atoms.

4. A compound according to claim 1 wherein R is selected from the group consisting of alkyl groups with from about 2 to about 8 carbon atoms, aryl groups with from about 6 to about 20 carbon atoms, and alkylene ether groups wherein the alkylene groups have from about 1 to about 4 carbon atoms.

5. A compound according to claim 1 wherein R" is selected from the group consisting of alkyl groups with from about 1 to about 22 carbon atoms and alkoxy groups with from about 1 to about 20 carbon atoms.

6. A compound according to claim 1 wherein R" is selected from the group consisting of alkyl groups with from about 1 to about 10 carbon atoms and alkoxy groups with from about 1 to about 10 carbon atoms.

7. A compound according to claim 1 wherein the number average molecular weight is from about 500 to about 100,000.

8. A compound according to claim 1 wherein the number average molecular weight is from about 500 to about 20,000.

9. A compound according to claim 1 wherein the phenylsulfide monomer units ("C") are present in an amount of up to 95 phenyl sulfide monomers ("C") per 5 sulfonium monomer units ("A").

10. A compound according to claim 1 wherein the ratio of phenylsulfide monomer units ("C") to sulfonium monomer units ("A") is from about 50:50 to about 80:20.

11. A process for preparing a polyester compound of the formula

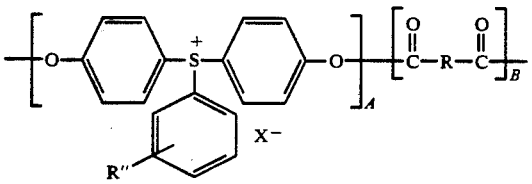

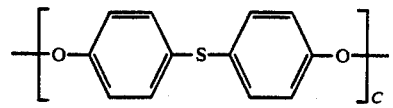

wherein X is an anion with weak nucleophilicity, A, B, and C represent the number of monomer units, wherein C may be zero, R is selected from the group consisting of hydrocarbon groups and alkylene ether groups, and R" is selected from the group consisting of hydrogen, nitro, amide, halide, trimethylsilyl, alkyl groups, and alkoxy groups, which comprises reacting a member selected from the group consisting of thiodiphenol and thiodiphenol derivatives, an optional diol, and a member selected from the group consisting of dicarboxylic acids and dicarboxylic acid derivatives to obtain a precursor polyester, followed by reacting the precursor polyester with a diphenyl iodonium salt in the presence of a catalyst.

12. A process according to claim 11 wherein the thiodiphenol is selected from the group consisting of 4,4'-thiodiphenol, 3,3'-dimethyl-4,4'-thiodiphenol, 3,3'-thiodiphenol, 3,4'-thiodiphenol, 3,3'-dichloro-4,4'-thiodiphenol, and mixtures thereof, the diol is selected from the group consisting of 1,3-propanediol, 1,6-hexanediol, 2,2-dimethyl-1,3-propanediol, diethylene glycol, triethylene glycol, 1,3-benzene-dimethanol, 1,4-benzene-dimethanol, 1,3-benzene diethanol, 2-butene-1,4-diol, bisphenol A, bis (4-hydroxyphenyl) methane, 4,4'-dihydroxy-diphenol-2,2-butane, 4,4'-dihydroxydiphenyl, catechols, resorcinols, hydroquinones, 2,6-dihydroxybenzoic acid ethyl ester, 4,4'-dihydroxydiphenyl ether, and mixtures thereof, the dicarboxylic acid or dicarboxylic acid derivative is selected from the group consisting of 1,4-butane dicarboxylic acid, 1,8-octane dicarboxylic acid, 1,4-cyclohexane dicarboxylic acid, fumaric acid, phenylene diacetic acids, 1,4-phenylene diacrylic acid, muconic acid, terephthalic acids, phthalic acids, isophthalic acids, adipyl diacid chloride, sebacyl diacid chloride, isophthaloyl diacid chloride, terephthaloyl diacid chloride, 2,2-bis(4-carboxyphenyl)propane diacid chloride, bis(4-carboxyphenyl)ketone diacid chloride, 2,5-pyridinedicarboxylic acid chloride, 4,4'-biphenyldicarboxylic acid chloride, and mixtures thereof, the diphenyliodonium salt is selected from the group consisting of diphenyliodonium hexafluoroarsenate, diphenyliodonium hexafluorophosphate, diphenyliodonium hexafluoroantimonate, di-(4-t-butylphenyl)iodonium hexafluorophosphate, di-(4-t-butylphenyl)iodonium hexafluoroarsenate, di-(4-i-butylphenyl)iodonium hexafluoroantimonate, di-(4-methoxyphenyl)iodonium tetrafluoroborate, di-(4-chlorophenyl)iodonium hexafluoroarsenate, and mixtures thereof, and the catalyst is selected from the group consisting of copper(II) benzoate, copper (I) chloride, copper (II) acetylacetonate, copper (II) acetate, copper (II) benzoate, copper (II) stearate, and mixtures thereof.

13. A process for preparing polycarbonate compounds of the formula

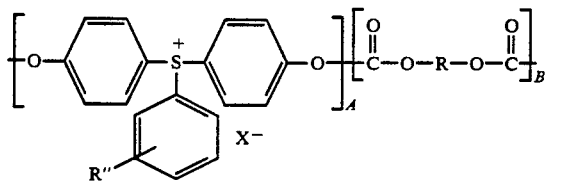

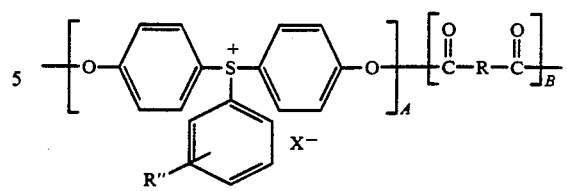

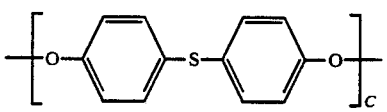

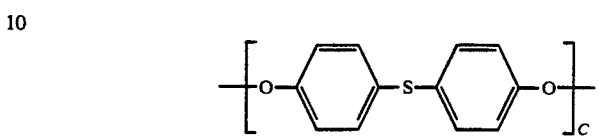

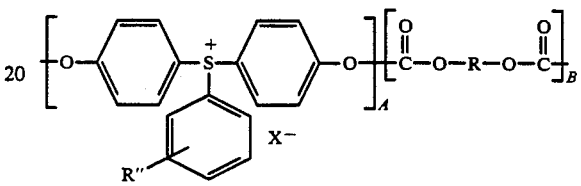

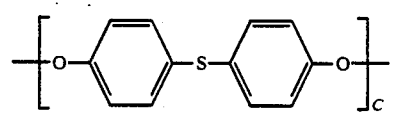

wherein X is an anion with weak nucleophilicity, A, B, and C represent the number of monomer units, wherein C may be zero, R is selected from the group consisting of hydrocarbon groups and alkylene ether groups, and R" is selected from the group consisting of hydrogen, nitro, amide, halide, trimethylsilyl, alkyl groups, and alkoxy groups, which comprises reacting a member selected from the group consisting of thiodiphenols and thiodiphenol derivatives, an optional diol, and a bishaloformate to obtain a precursor polycarbonate, followed by reacting the precursor polycarbonate with a diphenyl iodonium salt in the presence of a catalyst.

14. A process according to claim 13 wherein the thiodiphenol or thiodiphenol derivative is selected from the group consisting of 4,4'-thiodiphenol, 3,3'-dimethyl-4,4'-thiodiphenol, 3,3'-thiodiphenol, 3,4'-thiodiphenol, 3,3'-dichloro-4,4'-thiodiphenol, and mixtures thereof, the diol is selected from the group consisting of 1,3-propanediol, 1,6-hexanediol, 2,2-dimethyl-1,3-propanediol, diethylene glycol, triethylene glycol, 1,3-benzene dimethanol, 1,4-benzene-dimethanol, 1,3-benzene diethanol, 2-butene-1,4-diol, bisphenol A, 4,4'-dihydroxy-diphenol-2,2-butane, 4,4'-dihydroxy-diphenyl, catechols, resorcinols, hydroquinones, 2,6-dihydroxybenzoic acid ethyl ester, 4,4'-dihydroxy-diphenyl ether, and mixtures thereof, the bishaloformate is selected from the group consisting of ethylene glycol bischloroformate, diethylene glycol chloroformate, triethylene glycol bischloroformate, propylene glycol bischloroformate, 1,6-hexanediol bischloroformate, 1,4-butanediol bischloroformate, bisphenol A-bischloroformate, hydroquinone bischloroformate, 4,4'-biphenol bischloroformate, resorcinol bischloroformate, ethylene bischloroformate, 2,2-dimethyltrimethylene bischloroformate, 1,4-cyclohexylene bischloroformate, 3-oxapentane-1,5-bischloroformate, 1,4-phenylenebischloroformate, and mixtures thereof, the diphenyliodonium salt is selected from the group consisting of diphenyliodonium hexafluoroarsenate, diphenyliodonium hexafluorophosphate, diphenyliodonium hexafluoroantimonate, di-(4-t-butylphenyl)iodonium hexafluorophosphate, di-(4-t-butylphenyl)iodonium hexafluoroarsenate, di-(4-i-butylphenyl)iodonium hexafluoroantimonate, di-(4-methoxyphenyl)iodonium tetrafluoroborate, di-(4-chlorophenyl)iodonium hexafluoroarsenate, and mixtures thereof, and the catalyst is selected from the group consisting of copper(II) benzoate, copper (I) chloride, copper (II) acetylacetonate, copper (II) acetate, copper (II) benzoate, copper (II) stearate, and mixtures thereof.

15. A curing process which comprises contacting a curable liquid with a polymeric compound selected from the group consisting of and wherein X is an anion with weak nucleophilicity, A, B, and C represent the number of monomer units, wherein C may be zero, R is selected from the group consisting of hydrocarbon groups and alkylene ether groups, and R" is selected from the group consisting of hydrogen, nitro, amide, halide, trimethylsilyl, alkyl groups, and alkoxy groups, and curing the liquid to a solid.

16. A curing process according to claim 15 wherein the number average molecular weight is from about 500 to about 100,000.

17. A curable liquid developer composition comprising a colorant, a polymeric compound selected from the group consisting of

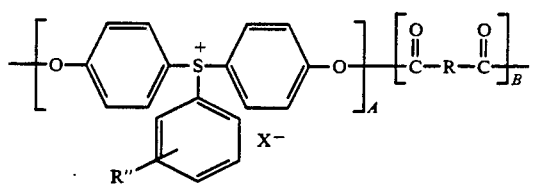

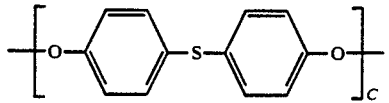

and

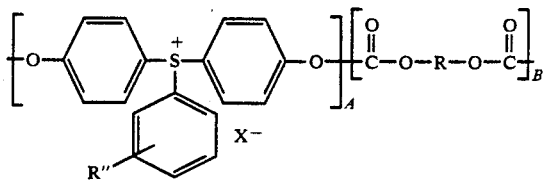

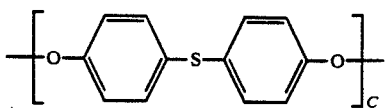

wherein X is an anion with weak nucleophilicity, A, B, and C represent the number of monomer units, wherein C may be zero, R is selected from the group consisting of hydrocarbon groups and alkylene ether groups, and R" is selected from the group consisting of hydrogen, nitro, amide, halide, trimethylsilyl, alkyl groups, and alkoxy groups, and a substantial amount of a curable liquid vehicle having a viscosity of no more than about 500 centipoise and a resistivity of no less than about $10^8$ ohm-cm.

18. A curable liquid developer according to claim 17 wherein the number average molecular weight is from about 500 to about 100,000.

19. A curable liquid developer according to claim 17 wherein X is selected from the group consisting of $AsF_6^-$, $SbF_6^-$, $PF_6^-$, $CF_3SO_3^-$, $BF_4^-$, $HSO_4^-$, $CF_3COO^-$, $NO_2$—$C_6H_4$—$SO_3^-$, and mixtures thereof.

20. A curable liquid developer according to claim 17 wherein R is selected from the group consisting of alkyl groups with from about 1 to about 22 carbon atoms, aryl groups with from about 6 to about 50 carbon atoms, and alkylene ether groups wherein the alkylene groups have from about 1 to about 10 carbon atoms.

21. A curable liquid developer according to claim 17 wherein R is selected from the group consisting of alkyl groups with from about 2 to about 8 carbon atoms, aryl groups with from about 6 to about 20 carbon atoms, and alkylene ether groups wherein the alkylene groups have from about 1 to about 4 carbon atoms.

22. A curable liquid developer according to claim 17 wherein R" is selected from the group consisting of alkyl groups with from about 1 to about 22 carbon atoms and alkoxy groups with from about 1 to about 20 carbon atoms.

23. A curable liquid developer according to claim 17 wherein R" is selected from the group consisting of alkyl groups with from about 1 to about 10 carbon atoms and alkoxy groups with from about 1 to about 10 carbon atoms.

24. A curable liquid developer according to claim 17 wherein the number average molecular weight is from about 500 to about 100,000.

25. A curable liquid developer according to claim 17 wherein the ratio of phenylsulfide monomer units ("C") to sulfonium monomer units ("A") is from about 0:100 to about 95:5.

26. A curable liquid developer according to claim 17 wherein the ratio of phenylsulfide monomer units ("C") to sulfonium monomer units ("A") is from about 50:50 to about 80:20.

27. A curing process according to claim 15 wherein X is selected from the group consisting of $AsF_6^-$, $SbF_6^-$, $PF_6^-$, $CF_3SO_3^-$, $BF_4^-$, $HSO_4^-$, $CF_3COO^-$, $NO_2$—$C_6H_4$—$SO_3^-$, and mixtures thereof.

28. A curing process according to claim 15 wherein R is selected from the group consisting of alkyl groups with from about 1 to about 22 carbon atoms, aryl groups with from about 6 to about 50 carbon atoms, and alkylene ether groups wherein the alkylene groups have from about 1 to about 10 carbon atoms.

29. A curing process according to claim 15 wherein R is selected from the group consisting of alkyl groups with from about 2 to about 8 carbon atoms, aryl groups with from about 6 to about 20 carbon atoms, and alkylene ether groups wherein the alkylene groups have from about 1 to about 4 carbon atoms.

30. A curing process according to claim 15 wherein R" is selected from the group consisting of alkyl groups with from about 1 to about 22 carbon atoms and alkoxy groups with from about 1 to about 20 carbon atoms.

31. A curing process according to claim 15 wherein R" is selected from the group consisting of alkyl groups with from about 1 to about 10 carbon atoms and alkoxy groups with from about 1 to about 10 carbon atoms.

32. A curing process according to claim 15 wherein the ratio of phenylsulfide monomer units ("C") to sulfonium monomer units ("A") is from about 0:100 to about 95:5.

33. A curing process according to claim 15 wherein the ratio of phenylsulfide monomer units ("C") to sulfonium monomer units ("A") is from about 50:50 to about 80:20.

* * * * *